United States Patent
Davis

(10) Patent No.: US 7,557,992 B2
(45) Date of Patent: *Jul. 7, 2009

(54) MULTI-MODE COLOR FILTER

(75) Inventor: Michael T. Davis, Richardson, TX (US)

(73) Assignee: Texas Instruments Incorporated, Dallas, TX (US)

(*) Notice: Subject to any disclaimer, the term of this patent is extended or adjusted under 35 U.S.C. 154(b) by 678 days.

This patent is subject to a terminal disclaimer.

(21) Appl. No.: 10/979,430

(22) Filed: Nov. 2, 2004

(65) Prior Publication Data

US 2005/0063082 A1 Mar. 24, 2005

Related U.S. Application Data

(62) Division of application No. 10/335,454, filed on Dec. 31, 2002, now Pat. No. 6,813,087.

(60) Provisional application No. 60/345,720, filed on Dec. 31, 2001.

(51) Int. Cl.
*G02B 27/14* (2006.01)

(52) U.S. Cl. .................. 359/634; 359/889; 359/890; 349/106

(58) Field of Classification Search .......... 359/634, 359/887–891; 349/104, 106; 348/268–271, 348/273, 276–280, 742, 743
See application file for complete search history.

(56) References Cited

U.S. PATENT DOCUMENTS

| | | | |
|---|---|---|---|
| 4,197,559 A | 4/1980 | Gramling | |
| 5,371,543 A | 12/1994 | Anderson | |
| 5,583,688 A | 12/1996 | Hornbeck | |
| 5,650,832 A | 7/1997 | Poradish et al. | |
| 6,359,662 B1 | 3/2002 | Walker | |
| 6,591,022 B2 * | 7/2003 | Dewald | 382/274 |
| 6,642,969 B2 | 11/2003 | Tew | |
| 6,771,325 B1 | 8/2004 | Dewald et al. | |
| 2001/0043289 A1 | 11/2001 | Marshall | |
| 2002/0093499 A1 | 7/2002 | Penn et al. | |
| 2002/0105729 A1 | 8/2002 | Richards et al. | |

* cited by examiner

*Primary Examiner*—Huy K Mai
(74) *Attorney, Agent, or Firm*—Charles A. Brill; Wade James Brady, III; Frederick J. Telecky, Jr.

(57) ABSTRACT

A multi-mode color filter 400 having an inner hub region 402 used to mount the color filter 400 to a motor shaft. A first track 404 and a second track 406 of color filter segments are formed on the color filter, as is an optional clear track 406. The first and second tracks each have a different set of color filters. One set of filters is chosen to improve image brightness, another set is selected to improve color saturation. Typically, the set of filters used to improve brightness includes one or more clear segments, while the set of filters selected to improve color saturation does not. Depending on the image being projected, the user or the display controller moves the color wheel to select a particular filter set.

20 Claims, 3 Drawing Sheets

MULTI-MODE COLOR FILTER

This application is a Divisional of application Ser. No. 10/335,454, filed Dec. 31, 2002 now U.S. Pat. No. 6,813,087 and Provisional Application No. 60/345,720, filed Dec. 31, 2001.

CROSS-REFERENCE TO RELATED APPLICATIONS

The following patents and/or commonly assigned patent applications are hereby incorporated herein by reference:

| U.S. Pat. No. | Filing Date | Issue Date | Title |
| --- | --- | --- | --- |
| 5,583,688 | Dec. 21, 1993 | Dec. 10, 1996 | Multi-Level Digital Micromirror Device |
| 5,371,543 | Aug. 17, 1993 | Dec. 6, 1994 | Monolithic Color Wheel |
| 09/705,467 | Nov. 3, 2000 | | Sequential Color Recapture For Projection Systems |
| 09/746,307 | Dec. 21, 2000 | | Color Wheel For Falling Raster Scan |

FIELD OF THE INVENTION

This invention relates to the field of display systems, more field sequential color display systems, still more particularly to color filters for use in sequential color display systems.

BACKGROUND OF THE INVENTION

Spatial light modulator projection display systems create a full color image from a beam of white light in one of two different ways. A first type of display separates the white light into the three primary colors and simultaneously modulates the three primary color light beams. The three modulated light beams are then recombined to form the full color image. This type of display requires three modulators and typically uses a set of dichroic crosses or a color splitting prism assembly.

The second type of display is a sequential color display. Sequential color displays sequentially filter the beam of white light to create a single filtered beam whose color alternates over time between the three primary colors. A single modulator modulates the filtered beam of light in synchronously with the filter sequence to produce three primary colored images in rapid succession. The viewer's eye integrates the three sequential images to provide the perception of a full color image.

Sequential color displays require a faster modulator in order to be able to generate three separate images within the frame period. Sequential color display systems typically use simpler optics and require less alignment and are therefore typically cheaper to produce. Unfortunately, because only one third of the available light is being used at any given time, sequential color systems produce dimmer images compared to three color systems using the same light source.

One method of increasing the brightness of sequential color display systems is to include an additional period during which white light is modulated. The white period increases the available light, but reduces the color saturation of the image. The tradeoff between brightness and saturation results in a compromise that is based on how the projection system will be used. What is needed is a method and system to improve the compromise between increased brightness and color saturation.

SUMMARY OF THE INVENTION

Objects and advantages will be obvious, and will in part appear hereinafter and will be accomplished by the present invention that provides a method and system for a multi-mode color filter.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENTS

A new color filter and method of operation have been discovered which allow sequential color display systems to alter their color and brightness performance to better suit the desires of the projectionist, environmental conditions, or the characteristics of images. According to one embodiment of the present invention, a color filter is provided. The color filter comprising: a center hub portion; a first track comprised of a first plurality of color filters around a perimeter of the hub portion; and a second track comprised of a second plurality of color filters around a perimeter of the first track.

Another embodiment of the present invention provides a display system. The display system comprising: a light source producing a beam of light; a color filter comprising: a center hub portion; a first track comprised of a first plurality of color filters around a perimeter of the hub portion; and a second track comprised of a second plurality of color filters around a perimeter of the first track; and a spatial light modulator receiving the filtered beam of light and selectively modulating the filtered beam of light in response to electronic image data.

Yet another embodiment of the present invention provides a method of producing a color image. The method of producing a color image comprising: providing a beam of white light; providing a color filter having first track comprised of a plurality of color filters and a second track comprised of a plurality of color filters; moving the color filter to position one of the first and second tracks in the beam of light; spinning the color filter to sequentially filter the beam of light; selectively modulating the filtered beam of light in response to electronic image data; and focusing the selectively modulated beam of light onto an image plane.

Figure 1:
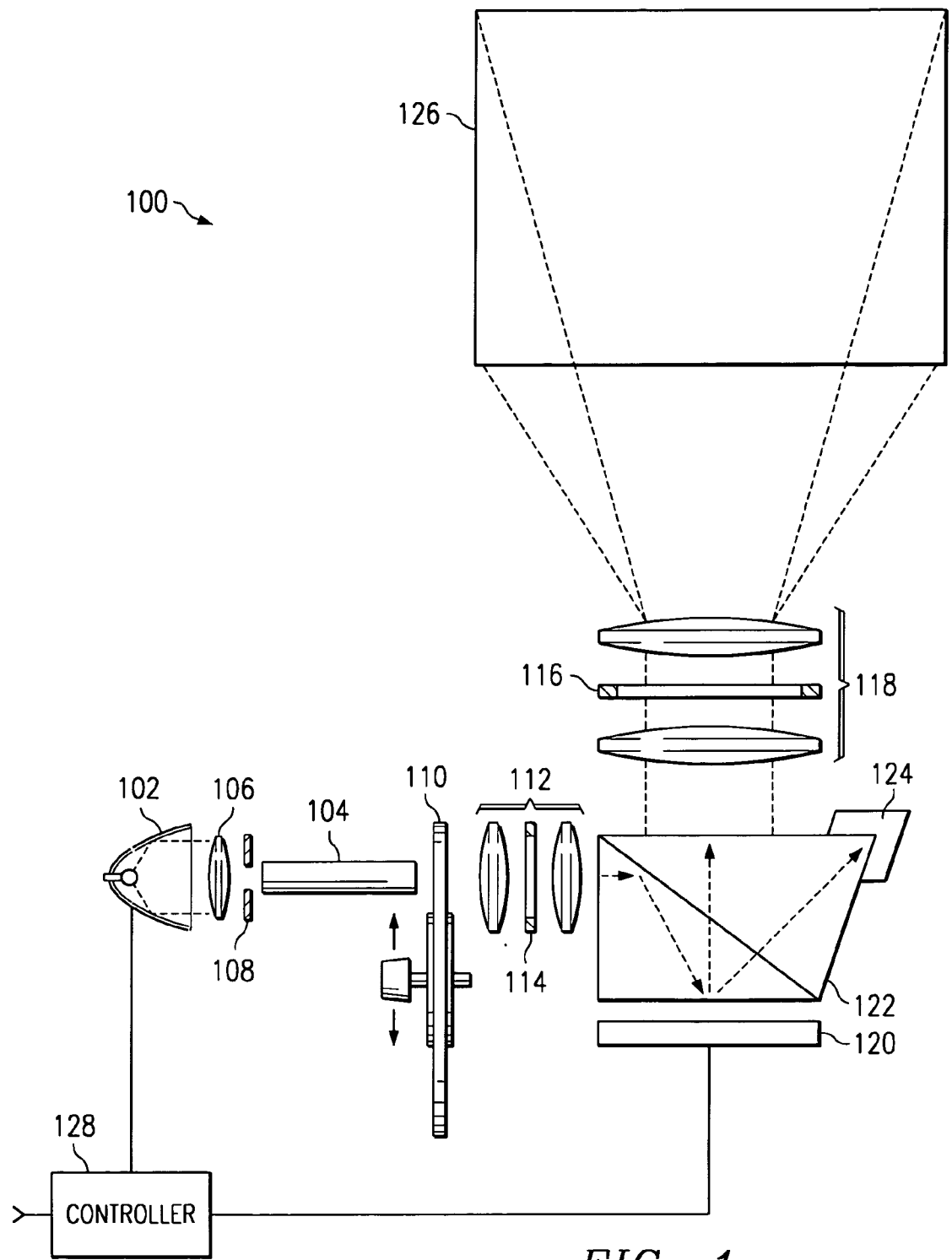
FIG. 1 is a schematic view of a sequential color display system according to one embodiment of the present invention.

FIG. 1 is a schematic view of a micromirror-based projection system 100 utilizing the one embodiment of the optical components and methods described herein. In FIG. 1, light from light source 104 is focused on the entrance pupil of an integrating rod 104 by lens group 106. The entrance pupil of the integrating rod 104 is surrounded by a reflective aperture stop 108. Light striking the reflective aperture stop 108 is returned to the light source. The integrating rod 104 homogenizes the light passing through it. Light exiting the integrating rod 104 passes through a multi-mode color wheel 110—which will be described in more detail below. The multi-mode color wheel 110 is attached to a motor shaft to allow it to be spun in the light path. The multi-mode color wheel 110 is also operable to move in and out of the light path so that the light path passes through one of the two or more tracks on the color wheel.

The light passing through the color wheel 110 is focused by lens group 112. Aperture stop 114 typically is located in lens group 112. Lens group 112 focuses the illumination light onto a spatial light modulator 120 through a TIR prism assembly 122. The off state light and the flat state light are directed to a light dump 124 which absorbs the light.

On state light exits the TIR prism assembly 122 and enters the projection lens 118. Another aperture stop 116 typically is used in the projection lens 118 to block a portion of the light, preventing it from passing through the lens to the image plane 122. Controller 128 provides image data and control signals to the spatial light modulator 120 to control the modulation of the illumination light in order to form an image on the image plane 126.

Many factors influence the image quality produced by a projection display. Two image characteristics of primary importance are brightness and color saturation. As described above, brightness and color saturation are often in opposition when selecting the characteristics of a color wheel. Color saturation in sequential color displays requires pure color filters. Brightness requires filters that allow as much light as possible to pass through.

A color wheel optimized for producing a bright image typically has wide filter pass bands that extend over the entire visible spectrum the with gradual cut-off regions. A high brightness color wheel typically has a clear segment to allow all visible light to pass to the spatial light modulator for a portion of the frame period. The terms clear segment and clear track are understood to mean a filter segment that allows the vast majority of the incident visible light across the entire spectrum to pass to the spatial light modulator. Although the segment appears clear, there may be various filter coatings used to remove infrared light, ultraviolet light, unwanted bands of visible light, or simply to reduce reflections. The clear segment passes white light and therefore is sometimes referred to as a white segment.

Figure 2:
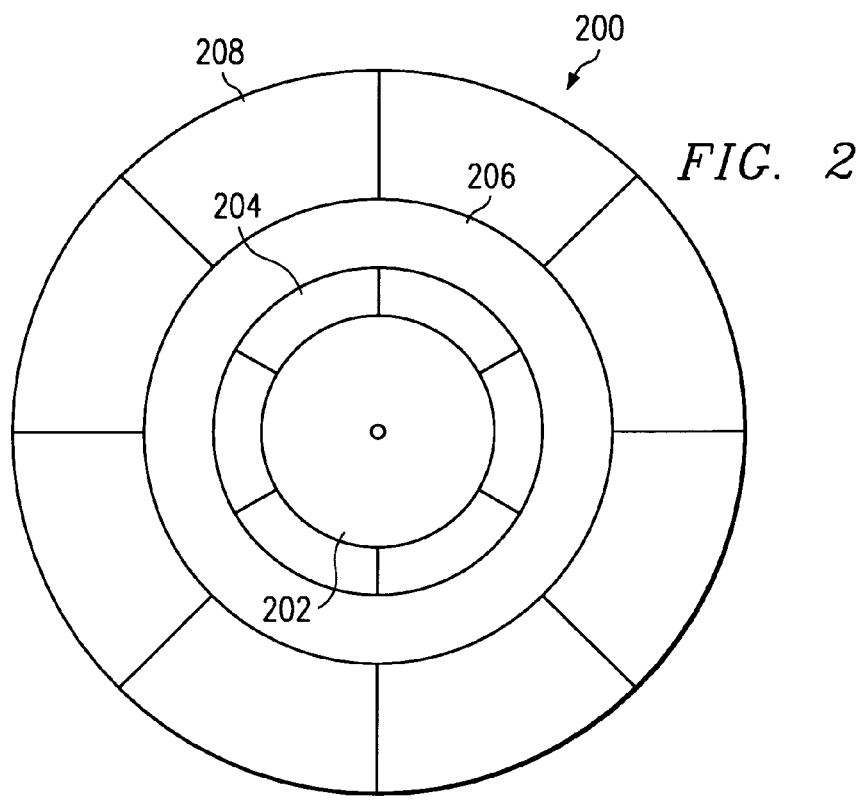
FIG. 2 is a plan view of one embodiment of a field sequential color wheel according to one embodiment of the present invention.

FIG. 2 is a plan view of a multi-mode color wheel 200 according to one embodiment of the present invention. The color wheel 200 of FIG. 2 has an inner hub region 202 used to mount the color wheel 200 to a motor shaft. Around the perimeter of the hub region 202 is a first track 204. The first track 204 is comprised of a series of radial color filters. On the perimeter of the first track 204 is an optional clear track 206. On the perimeter of the clear track 206 is a second track 208 comprised of a series of radial color filters.

The first and second tracks each have a different set of color filters. One set of filters is chosen to improve image brightness, another set is selected to improve color saturation. Typically, the set of filters used to improve brightness includes one or more clear segments, while the set of filters selected to improve color saturation does not. Depending on the image being projected, the user or the display controller moves the color wheel to select a particular filter set.

The optional clear segment, shown between the first and second tracks of the color wheel 202 in FIG. 2, is selected when black and white images are being displayed, or when brightness at the cost of all image color is desired. For example, in an environment with a high ambient light level, the high brightness set of color filters is selected. If the high brightness set of color filters fails to provide a sufficiently bright image, the clear track is selected. Because the clear segment is continuous around the filter, the filter can continue to spin during the monochromatic operation. This prevents thermal damage to the color filter. For example, if the color wheel was merely stopped in a position where the light beam passed through a clear segment, heat buildup from the intense light beam could shatter the wheel or burn any coatings on the wheel.

The number of filter segments, and the size of each filter segment varies. In general, the larger the number of filter segments, the slower the color wheel must spin and the quieter the color wheel can be. Alternatively, a larger number of color filter segments spun at a higher wheel rate provides additional color sub-planes which helps to prevent image artifacts.

Figure 3:
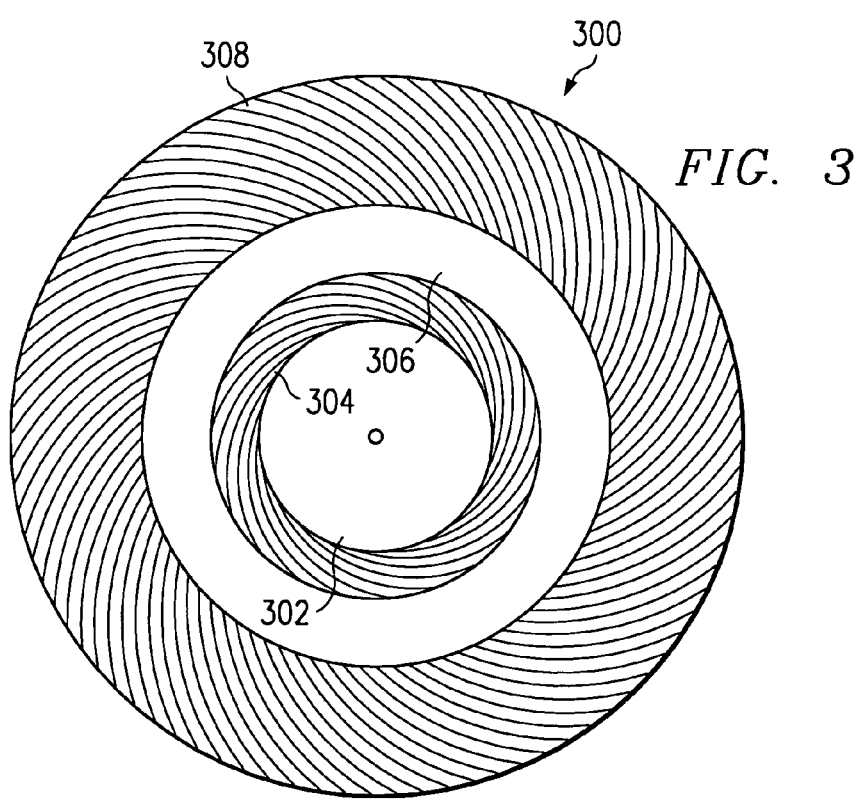
FIG. 3 is a plan view of one embodiment of a sequential color recapture wheel according to one embodiment of the present invention.

FIG. 3 is a plan view of a color wheel 300 according to a second embodiment of the present invention. The color wheel 300 of FIG. 3 also has an inner hub region 302 used to mount the color wheel 300 to a motor shaft. Around the perimeter of the hub region 302 is a first track 304. The first track 304 is comprised of a series of curved color filters. The filters in the first track are shaped to provide a falling raster effect across the spatial light modulator as the color wheel is turned. U.S. patent application Ser. No. 09/746,307, filed Dec. 21, 2000, entitled Color Wheel For Falling Raster Scan and assigned to Texas Instruments Incorporated describes the design and use of a falling raster scan color wheel.

On the perimeter of the first track 304 is an optional clear track 306. On the perimeter of the clear track 306 is a second track 308 also comprised of a series of curved color filters. As was the case with the color wheel of FIG. 2, the color wheel 300 of FIG. 3 also provides first and second tracks having different sets of color filters. One set of filters is chosen to improve image brightness, another set is selected to improve color saturation. Typically, the set of filters used to improve brightness includes one or more clear segments, while the set of filters selected to improve color saturation does not.

The optional clear segment 306, shown between the first and second tracks of the color wheel 302 in FIG. 3, once again is selected when black and white images are being displayed, or when brightness at the cost of all image color is desired.

Figure 4:
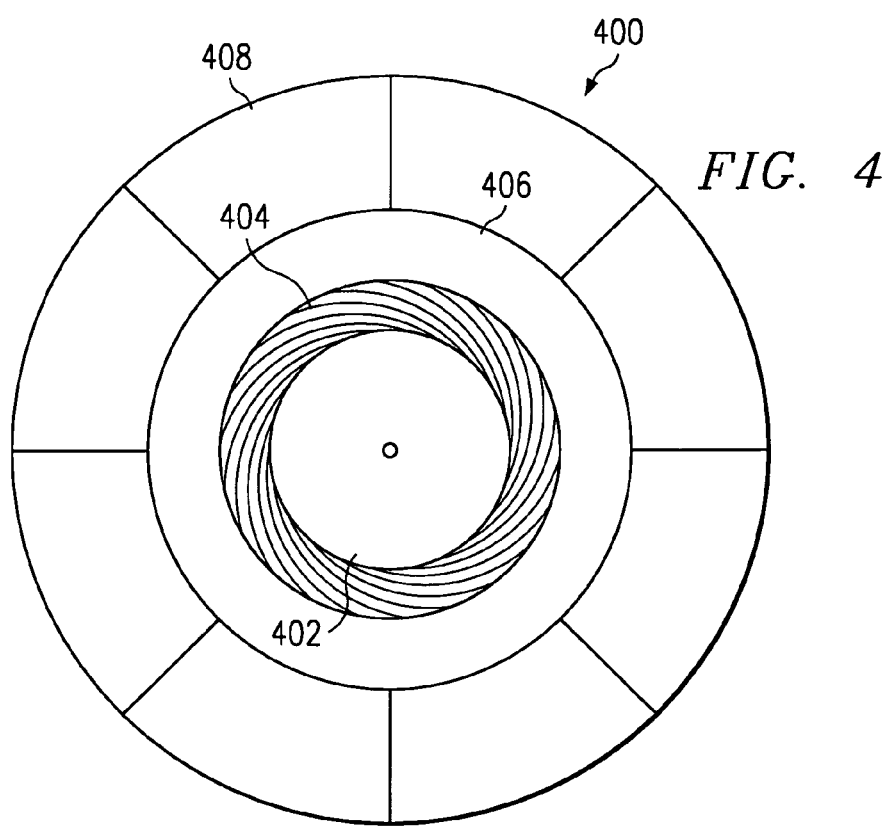
FIG. 4 is a plan view of one embodiment of a combination field sequential and sequential color recapture color wheel according to one embodiment of the present invention.

Another embodiment of the present invention is illustrated in FIG. 4. The color wheel 400 of FIG. 4 has a hub region 402 surrounded by a first track 404 of color filters. On the perimeter of the first track 404 is a section track of color filters 408 separated by a clear track 406. The first track 404 of color filters is comprised of curved color filters, while the second track 408 uses radial color filters. The curved filters are better suited to smaller diameter wheels, so their placement as the inside track of the wheel as shown in FIG. 4 is appropriate. The radial color filters are better suited to larger diameter wheels, so the radial filters are placed in the second track.

Once again, a clear segment separates the two tracks. As in the previous embodiments, the clear segment is optional. Alternate embodiments forego the use of a clear segment and abut the two tracks.

Figure 5:
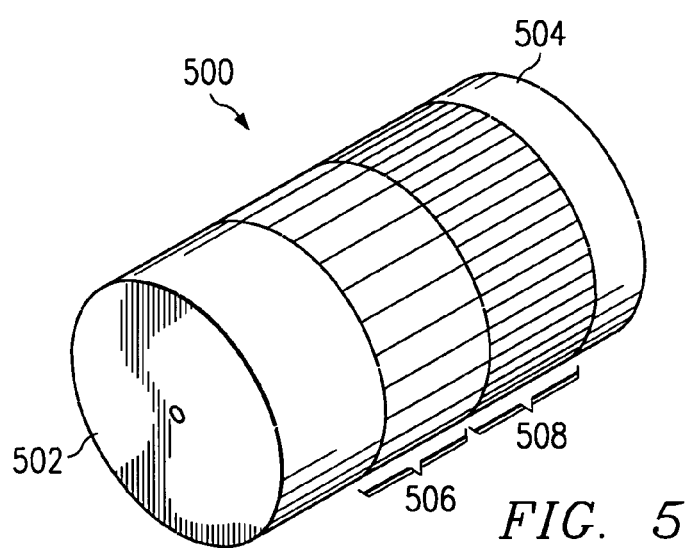
FIG. 5 is a perspective view of one embodiment of the present invention providing a drum-shaped multi-mode color filter.

Although all of the embodiments thus far have been illustrated as disc-shaped color wheels, other embodiments of the present invention are implemented using other shapes. For example, FIG. 5 is a perspective view of a color filter drum 500. In FIG. 5, a central hub region 502 provides a location to mount the filter to a motor. Alternatively, a portion 504 of the drum may be the central hub region and be driven by a belt. As in the prior embodiments, a first track of color filters 506 and a second track of color filters 508 are fixed to the drum.

All of the embodiments described above may be implemented using either transmission filters or reflection filters. Transmissive filters typically are used, in part because they enable light recycling by returning the light rejected by the filter toward the light source.

Thus, although there has been disclosed to this point a particular embodiment for a multi-mode color wheel and method therefore, it is not intended that such specific references be considered as limitations upon the scope of this invention except insofar as set forth in the following claims. Furthermore, having described the invention in connection with certain specific embodiments thereof, it is to be understood that further modifications may now suggest themselves to those skilled in the art, it is intended to cover all such modifications as fall within the scope of the appended claims. In the following claims, only elements denoted by the words "means for" are intended to be interpreted as means plus function claims under 35 U.S.C. § 112, paragraph six.

What is claimed is:

1. A color filter comprising:
   a rotatable substrate;
   at least two tracks of color filters;
   at least one of said tracks of color filters comprising a plurality of curved filter segments.

2. The color filter of claim 1, at least one of said tracks of filters comprising primary color filters.

3. The color filter of claim 1, at least one of said tracks of filters comprising primary color filters and a clear filter.

4. The color filter of claim 1, comprising a clear track.

5. The color filter of claim 1, at least one of said color filters comprising a dichroic filter deposited on a substrate.

6. The color filter of claim 1, at least two of said color filters comprising dichroic filters deposited on a common substrate.

7. The color filter of claim 1, said rotatable substrate having a drum shape.

8. A display system comprising:
   a light source producing a beam of light;
   a color filter receiving said beam of light and producing a filtered beam of light, said color filter comprising:
      a rotatable substrate;
      at least two tracks of color filters;
      at least one of said tracks of color filters comprising a plurality of curved filter segments; and
   a spatial light modulator receiving said filtered beam of light and selectively modulating said filtered beam of light in response to electronic image data.

9. The display system of claim 8, comprising:
   a projection lens receiving said modulated light beam and focusing said modulated light beam on an image plane.

10. The display system of claim 8, at least one of said tracks of filters comprising primary color filters.

11. The display system of claim 8, at least one of said tracks of filters comprising primary color filters and a clear filter.

12. The display system of claim 8, comprising a clear track.

13. The display system of claim 8, at least one of said color filters comprising a dichroic filter deposited on a substrate.

14. The display system of claim 8, at least two of said color filters comprising dichroic filters deposited on a common substrate.

15. The display system of claim 8, said rotatable substrate having a drum shape.

16. A method of producing a color image, comprising:
   providing a beam of white light;
   providing a drum shape color filter having at least two tracks of color filters;
   moving said color filter to position one of said first and second tracks in said beam of light;
   spinning said color filter to sequentially filter said beam of light;
   selectively modulating said filtered beam of light in response to electronic image data; and
   focusing said selectively modulated beam of light onto an image plane.

17. The method of claim 16, said providing a color filter having at least two tracks of color filters comprising:
   providing a color filter having at least one track comprised of primary color filters.

18. The method of claim 16, said providing a color filter having at least two tracks of color filters comprising:
   providing a color filter having at least one track of color filters comprised of a clear filter.

19. The method of claim 16, said providing a color filter having at least two tracks of color filters comprising:
   providing a color filter having a clear track.

20. The method of claim 16, said step of providing a color filter comprising providing a drum shaped color filter having at least two tracks of color filter segments, at least one of said track comprised of color filter segments curved in a direction parallel to an axis of said drum.

* * * * *